United States Patent
Hayakawa

(10) Patent No.: US 12,105,347 B2
(45) Date of Patent: Oct. 1, 2024

(54) OPTICAL APPARATUS

(71) Applicant: CANON KABUSHIKI KAISHA, Tokyo (JP)

(72) Inventor: Makoto Hayakawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 707 days.

(21) Appl. No.: 17/235,052

(22) Filed: Apr. 20, 2021

(65) Prior Publication Data

US 2021/0349376 A1 Nov. 11, 2021

(30) Foreign Application Priority Data

May 11, 2020 (JP) .................. 2020-083261

(51) Int. Cl.
| | |
|---|---|
| G02B 7/04 | (2021.01) |
| G02B 7/10 | (2021.01) |
| G02B 7/02 | (2021.01) |
| G03B 17/12 | (2021.01) |

(52) U.S. Cl.
CPC ........... *G02B 7/04* (2013.01); *G02B 7/10* (2013.01); *G02B 7/026* (2013.01); *G03B 17/12* (2013.01); *G03B 2205/0046* (2013.01)

(58) Field of Classification Search
CPC . G02B 7/04; G02B 7/10; G02B 7/026; G03B 17/12; G03B 2205/0046
USPC ......................... 359/694, 699–701
See application file for complete search history.

(56) References Cited

U.S. PATENT DOCUMENTS

| | | | |
|---|---|---|---|
| 5,400,181 | A | 3/1995 | Takayama |
| 6,456,445 | B2 | 9/2002 | Nomura |
| 9,551,855 | B2 | 1/2017 | Nagao |
| 10,571,784 | B2 | 2/2020 | Hatano et al. |
| 10,921,543 | B2 | 2/2021 | Uemura |
| 11,029,479 | B2 | 6/2021 | Yoshida |
| 2001/0015860 | A1* | 8/2001 | Nomura ............ G02B 7/10 359/701 |
| 2016/0077304 | A1* | 3/2016 | Nagao ............ G02B 7/102 29/428 |

(Continued)

FOREIGN PATENT DOCUMENTS

| | | |
|---|---|---|
| CN | 101458387 A | 6/2009 |
| CN | 107430257 A | 12/2017 |

(Continued)

*Primary Examiner* — George G. King
(74) *Attorney, Agent, or Firm* — ROSSI, KIMMS & McDOWELL LLP

(57) ABSTRACT

Provided is an optical apparatus having good lens positioning accuracy and excellent optical performance.

The optical apparatus includes a straight-proceeding barrel configured to move on a lens group in an optical axis direction and a guide barrel having a guide groove part configured to guide the movement of the straight-proceeding barrel in the optical axis direction. In the guide groove part, a first guide groove part is formed in the optical axis direction so as to have a bottom on an outer diameter side, and a second guide groove part is formed in the optical axis direction as a through hole from the outer diameter side to an inner diameter side. The first guide groove part and the second guide groove part are connected to each other and have respective use regions configured to partially overlap each other in the optical axis direction.

10 Claims, 7 Drawing Sheets

(56) References Cited

U.S. PATENT DOCUMENTS

2019/0162926 A1   5/2019  Sasaki
2019/0235194 A1*  8/2019  Yoshida ................. G02B 7/10

FOREIGN PATENT DOCUMENTS

| CN | 110095850 A | 8/2019 |
| --- | --- | --- |
| CN | 110095852 A | 8/2019 |
| JP | H0627362 A | 2/1994 |
| JP | 2000121909 A | 4/2000 |
| JP | 2001215402 A | 8/2001 |
| JP | 2010145497 A | 7/2010 |
| JP | 6381382 B2 | 8/2018 |
| JP | 2019095728 A | 6/2019 |

\* cited by examiner

OPTICAL APPARATUS

BACKGROUND OF THE INVENTION

Field of the Invention

The present invention relates to an optical apparatus such as a lens barrel.

Description of the Related Art

For example, an interchangeable lens barrel disclosed in Japanese Patent No. 6381382 is configured with a cam barrel disposed on an inner circumferential side, a guide barrel disposed on an outer circumferential side thereof, and a zoom operation ring further disposed on an outer circumferential side thereof.

In the configuration of Japanese Patent No. 6381382, a diameter fitting part with a zoom operation ring is provided on the outer circumference of the guide barrel. The zoom operation ring is rotatably attached to the outer circumference of the guide barrel in a circumferential direction by this diameter fitting part. When this zoom operation ring is rotated, a straight-proceeding barrel moves in an optical axis direction without rotating in the circumferential direction in conjunction with the rotation, and the cam barrel rotates in the circumferential direction.

In the above configuration, it is important to suppress rattling of the diameter fitting part between the guide barrel and the zoom operation ring in positioning of the guide barrel and a zoom ring. The positioning of the zoom ring is important during positioning of the straight-proceeding barrel, and this positioning is greatly involved in the optical performance of an optical apparatus. In order to suppress rattling of the diameter fitting part between the guide barrel and the zoom operation ring, it is important that the fitting part of the guide barrel be formed to be fitted throughout its circumference with no notched portion. A notched portion causes an increase in rattling at a position where the notched portion is located.

On the other hand, in order to further increase the magnification of a zoom lens, it is generally required to increase the amount of feeding of each group. In addition, in order to efficiently dispose cam grooves of each group in the cam ring while securing the amount of rotation of the cam ring, it is considered effective to provide straight-proceeding grooves of each group provided in the guide barrel in common (shared).

However, in a case where the straight-proceeding grooves of each group are shared, the length of the straight-proceeding grooves becomes long, and thus there is a problem of overlapping the diameter fitting part of the guide barrel at a position in the optical axis direction. In this case, providing the guide barrel with the straight-proceeding grooves by penetration causes the diameter fitting part of the guide barrel to be notched. Thereby, positioning with the zoom ring is adversely affected, and as a result, there is concern of the optical performance of an optical apparatus being deteriorated.

SUMMARY OF THE INVENTION

An object of the present invention is to provide, for example, an optical apparatus having good lens positioning accuracy and excellent optical performance.

According to the present invention, there is provided an optical apparatus including: a straight-proceeding barrel configured to move on a lens group in an optical axis direction; and a guide barrel having a guide groove part configured to guide the movement of the straight-proceeding barrel in the optical axis direction, wherein, in the guide groove part, a first guide groove part is formed in the optical axis direction so as to have a bottom on an outer diameter side, and a second guide groove part is formed in the optical axis direction as a through hole from the outer diameter side to an inner diameter side, and the first guide groove part and the second guide groove part are connected to each other and have respective use regions configured to partially overlap each other in the optical axis direction.

Further features of the present invention will become apparent from the following description of exemplary embodiments with reference to the attached drawings.

DESCRIPTION OF THE EMBODIMENTS

Hereinafter, preferred embodiments of the present invention will be described using examples with reference to the accompanying drawings. Meanwhile, in each drawing, the same members or elements are denoted by the same reference numbers, and thus repeated description thereof will be omitted or simplified.

First Embodiment

Figure 1:
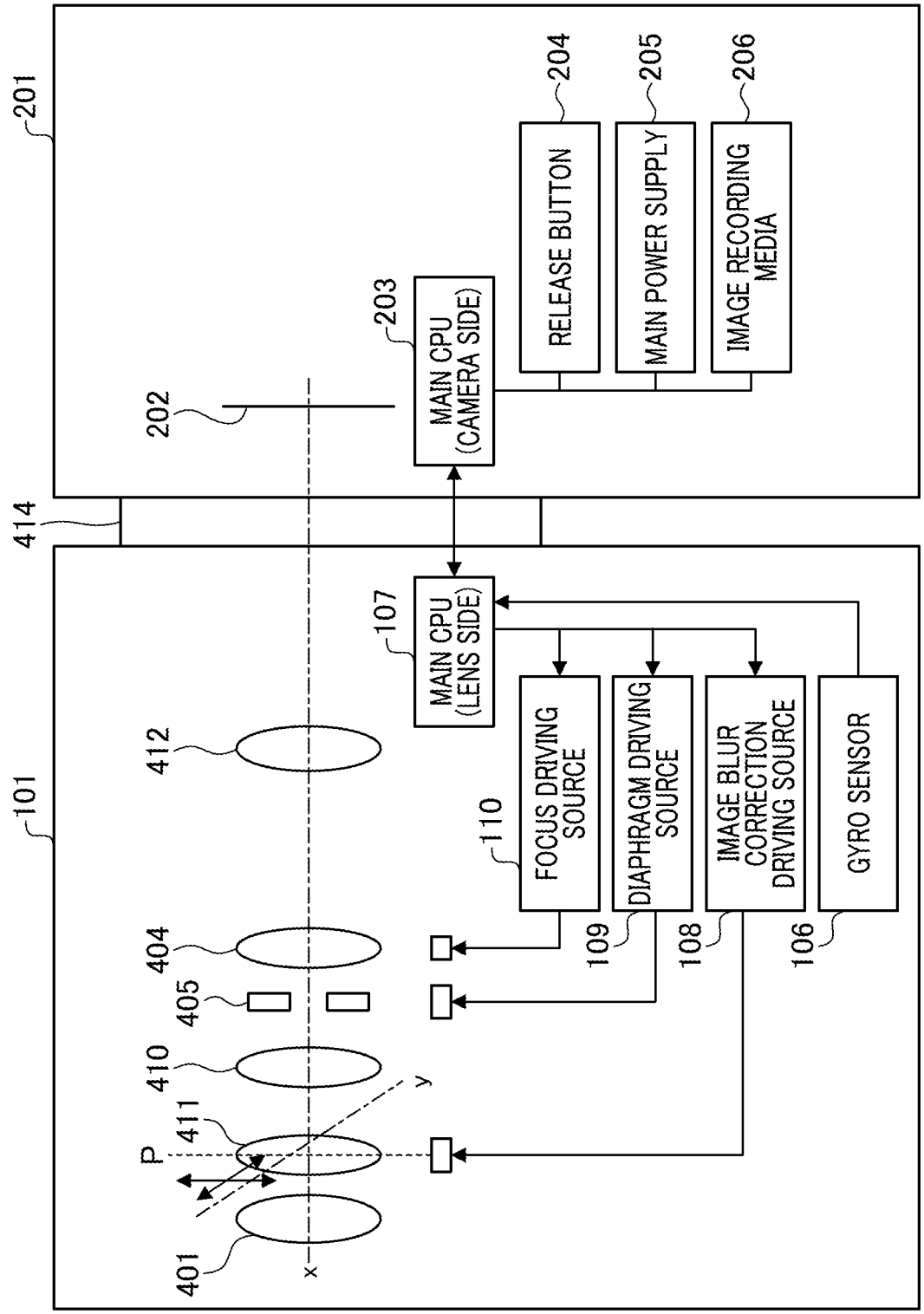
FIG. 1 is a diagram illustrating a system configuration of Example 1.

FIG. 1 is a diagram illustrating an example of a system configuration of a lens barrel (an optical apparatus) 101 and a camera 201 of the present example. Hereinafter, the system configuration of the lens barrel 101 and the camera 201 according to the present example will be described with reference to FIG. 1.

The lens barrel 101 may include a first group barrel 401, a focus barrel 404, a diaphragm unit 405, a rear group barrel 410, an image blur correction unit 411, and a fifth group barrel 412. In addition, the lens barrel may also include a gyro sensor 106, a lens-side main CPU 107, an image blur correction driving source 108, a diaphragm driving source 109, and a focus driving source 110. In addition, a lens group is held in each barrel.

The first group barrel 401 is fixed to the camera 201 with a mount 414 interposed therebetween, and captures an image of a subject by forming an image on an imaging element 202 which is held by the camera 201 through an optical imaging system within the lens barrel 101. The focus barrel 404 also functions as a holder that holds a fourth group lens 454 as will be described later, is moved in an optical axis direction (thrust direction) relative to the rear group barrel 410 by a driving mechanism, and performs focus adjustment. Here, the term "optical axis direction" refers to a direction along the optical axis (a direction in which the optical axis of the optical imaging system extends).

The diaphragm unit (light amount adjustment unit) 405 adjusts the amount of light which is incident on a first group lens 451 and guided to an imaging element. The diaphragm driving source 109 is a driving source of the diaphragm unit 405. The image blur correction unit (image blur correction device) 411 corrects, for example, disorder of an image due to a camera shake or the like. The image blur correction driving source 108 is a driving source of the image blur correction unit 411. The gyro sensor (angular velocity sensor) 106 is, for example, a sensor that detects a vibration component due to a camera shake or the like. In addition, the gyro sensor 106 also functions as a shake detection means (a detection unit) that detects these shakes.

The lens-side main CPU 107 functions as a lens-side control means (a lens-side control unit) that comprehensively controls driving of the entire lens or performs calculation. In addition, the diaphragm driving source 109, the focus barrel 404, and the diaphragm unit 405 are driven by issuing a driving command (instruction) from the lens-side main CPU 107. When image blur correction control is performed, the lens-side main CPU 107 calculates the amount of shake correction using the detection value of the gyro sensor 106, and sends an instruction to the image blur correction driving source 108. Shake correction is performed by driving the image blur correction unit 411 in a y direction (yaw direction) and a p direction (pitch direction) which are orthogonal to an optical axis x.

The image blur correction unit 411 and the image blur correction driving source 108 also function as an image blur correction means (an image blur correction unit). In addition, the lens-side main CPU 107 also functions as a determination means (a determination unit) that determines the holding state of the lens barrel 101 or the camera 201 from the detection value of the gyro sensor 106.

The camera 201 may include the imaging element 202, a camera-side main CPU 203, a release button 204, a main power supply 205, and image recording media 206.

The imaging element 202 captures (photoelectrically converts) a subject image formed by a flux of light having passed through the optical imaging system. The camera-side main CPU 203 functions as a camera-side control means (a camera-side control unit) that controls operations of various devices within the camera 201. In addition, electric power is supplied from the camera-side main CPU 203 to the lens barrel 101 through a contact block (not shown) provided on the mount, and other image capturing information is exchanged with the lens-side main CPU 107.

The release button 204 is an operation member having a two-step push configuration. The first step of the release button 204 is referred to as SW1 and the second is referred to as SW2. In SW1, an instruction for image capturing start preparation such as return from image capturing standby, start of camera-shake correction, start of autofocus, or start of photometry is performed. In SW2, image capturing is performed and an instruction for recording of an image in the image recording media 206 is performed.

Figure 2:
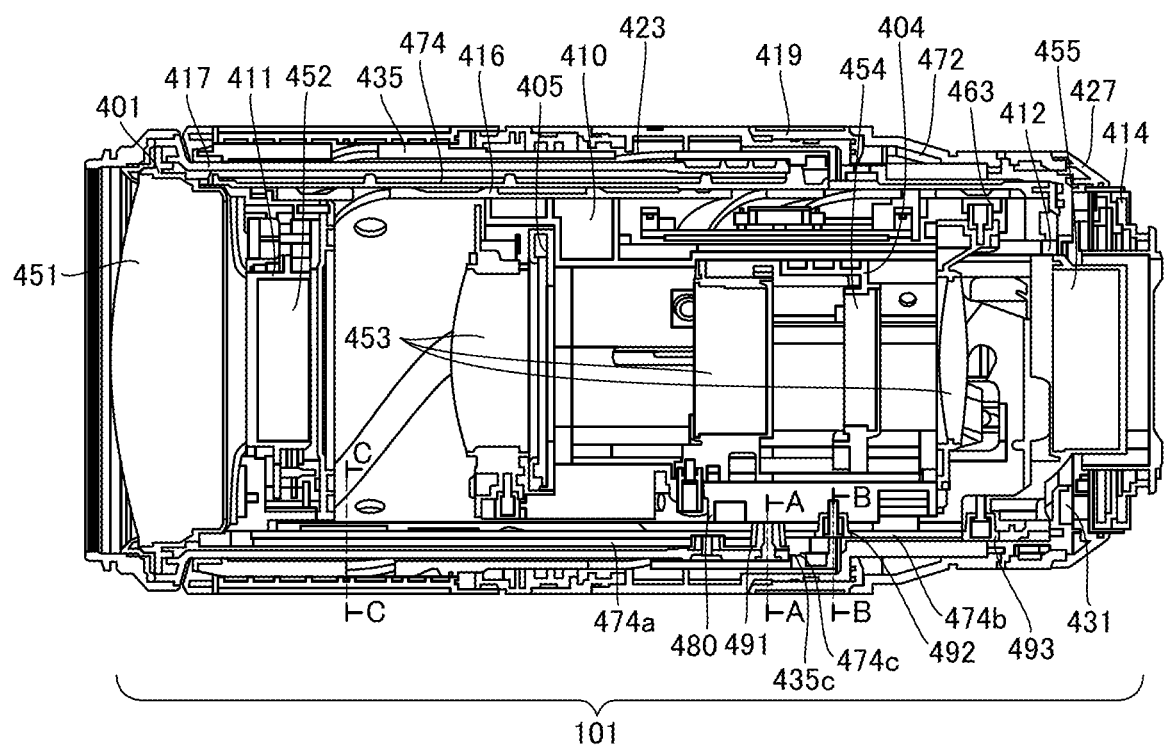
FIG. 2 is a cross-sectional view of an optical apparatus of Example 1.

FIG. 2 is a cross-sectional view of the lens barrel 101 which is used for an interchangeable lens as an optical apparatus of the present example. In addition, in the following description, the object side is defined as a side where a subject to be imaged is located, and is on the left side in the drawing of FIG. 2. The image surface side is defined as a side where the imaging element of the camera is located, and is on the right side in the drawing of FIG. 2. Meanwhile, although the interchangeable lens will be described in the present example, the same configuration can also be applied to the lens barrel of an image pickup apparatus such as a lens-integrated digital camera or a video camera.

The lens barrel 101 holds the optical imaging system (optical member) including the first group lens 451, a second group lens 452, a third group lens 453, the fourth group lens 454, and a fifth group lens 455.

The first group lens 451 is held by the first group barrel 401. A straight-proceeding barrel 417 is fixed to the first group barrel 401. The second group lens 452 is held by the image blur correction unit 411. In addition, the second group lens 452 can correct an image blur by moving in a direction perpendicular to the optical axis. The image blur correction unit 411 is fixed to a guide barrel 474. Meanwhile, the image blur correction unit 411 does not move in the optical axis direction through a zoom operation.

The third group lens 453 is held by the rear group barrel 410. The fourth group lens 454 is held by the focus barrel 404 and is held by the rear group barrel 410 with a guide mechanism provided in the focus barrel 404 interposed therebetween. The fifth group lens 455 is held by the fifth group barrel 412. The diaphragm unit 405 adjusts the amount of light, and is fixed to the rear group barrel 410. It is fixed by screws to a rear fixed barrel 472 located on the outer diameter (outer circumferential portion) side of the guide barrel 474, and is provided with a plurality of straight-proceeding grooves.

A cam ring 416 is a cam ring (a cam member) which is rotatably fitted to the inner circumference of the guide barrel 474. A plurality of cam grooves are provided in the circumferential direction of the cam ring 416.

A zoom ring (zoom operation ring) 435 is rotatably held by the guide barrel 474. Hereinafter, a zoom mechanism of the present example will be described. The zoom ring 435 is provided with a plurality of cam grooves. When the zoom ring 435 is manually rotated, the straight-proceeding barrel 417 is configured such that a cam follower 491 as a guide member is engaged with a cam groove (a first cam groove part) of the zoom ring 435 and a straight-proceeding groove 474a of the guide barrel 474, and thus the cam follower 491 slides and moves in the optical axis direction.

A substrate 431 is a printed substrate on which a driving IC or the like is disposed, and is fixed to the rear fixed barrel 472. An outward ring 427 is fixed by screws to the rear fixed barrel 472 together with the mount 414. A front fixed barrel 423 is fixed by screws to the rear fixed barrel 472.

A manual focus ring (MF) unit 419 is rotatably supported around the front fixed barrel 423. When the manual focus ring unit 419 is rotated, the rotation is detected by a sensor (not shown), and manual focus adjustment is performed in accordance with the amount of rotation. An AF motor 480 is fixed to the rear group barrel 410, and drives the focus barrel 404.

Figure 3:
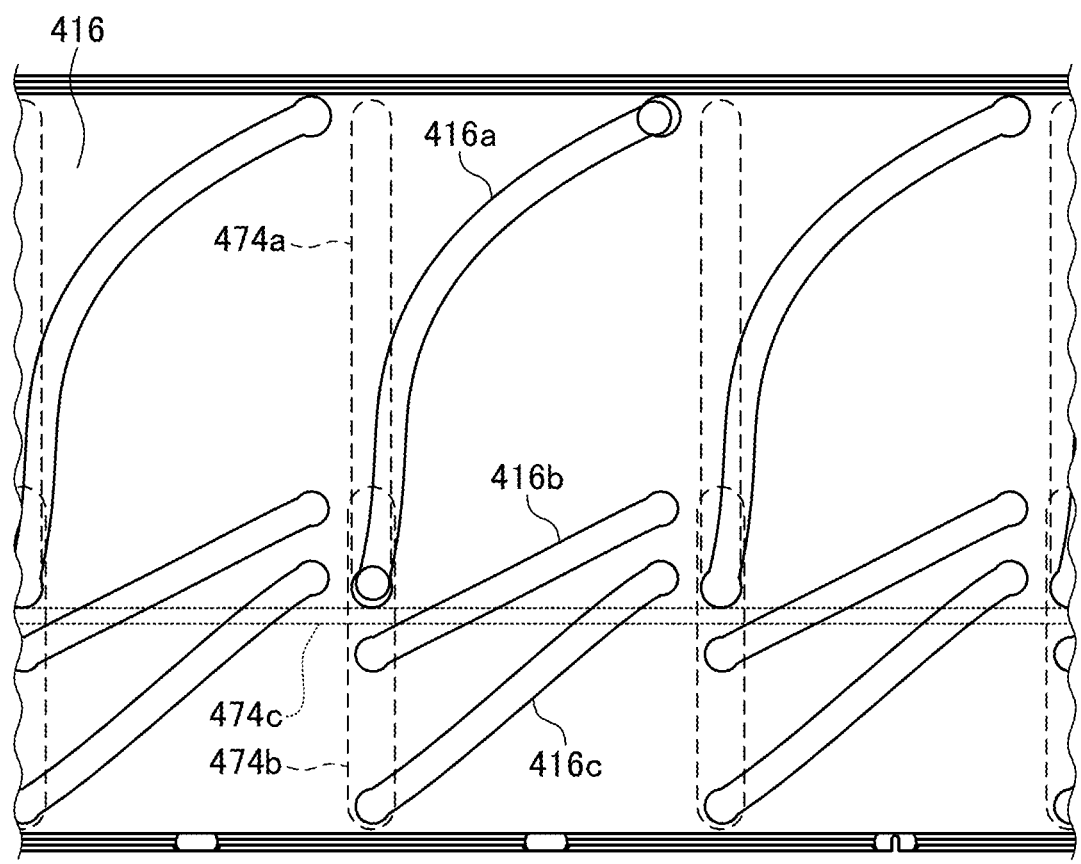
FIG. 3 is a developed view of a cam ring of Example 1 from an outer circumferential side.

FIG. 3 is a developed view of the cam ring 416 of the present example from the outer circumferential side. The dotted line parts shown in FIG. 3 represent straight-proceeding grooves of the guide barrel 474. Here, regarding the cam groove and the straight-proceeding groove shown in FIG. 3, a cam groove (a second cam groove part) 416a of the cam ring 416 is a cam groove of the straight-proceeding barrel 417. A cam groove (a third cam groove part) 416b of the cam ring 416 is a cam groove of the rear group barrel 410. A cam groove 416c of the cam ring 416 is a cam groove of the fifth group barrel 412. Here, the straight-proceeding groove (a second guide groove part) 474a and a straight-proceeding groove (a first guide groove part) 474b are guide grooves of the guide barrel 474. The straight-proceeding groove 474a of the guide barrel 474 is a straight-proceeding groove of the straight-proceeding barrel 417. The straight-proceeding groove 474b of the guide barrel 474 is a straight-proceeding groove common to the rear group barrel 410 and the fifth group barrel 412.

As described above, when the zoom ring 435 is manually rotated, the straight-proceeding barrel 417 is configured such that the cam follower (a first cam follower) 491 is engaged with the cam groove of the zoom ring 435 and the straight-proceeding groove 474a of the guide barrel 474, and thus the cam follower 491 slides and moves in the optical axis direction. The cam follower 491 provided in the straight-proceeding barrel 417 is also engaged with the cam groove 416a of the cam ring 416. Therefore, when the straight-proceeding barrel 417 moves in the optical axis direction, the cam ring 416 rotates around the optical axis.

The rear group barrel 410 is engaged with the cam groove 416b of the cam ring 416 and the straight-proceeding groove 474b of the guide barrel 474 with a cam follower (a second cam follower) 492 interposed therebetween. The fifth group barrel 412 is engaged with the cam groove 416c of the cam ring 416 and the straight-proceeding groove 474b of the guide barrel 474 with a cam follower (a third cam follower) 493 interposed therebetween. Thereby, as the cam ring 416 rotates, the cam follower 492 and the cam follower 493 slide, and the rear group barrel 410 and the fifth group barrel 412 move in the optical axis direction. In this manner, by manually rotating the zoom ring 435, the straight-proceeding barrel 417, the rear group barrel 410, and the fifth group barrel 412 move in the optical axis direction to thereby perform a zoom operation.

Here, the straight-proceeding groove 474a and the straight-proceeding groove 474b of the guide barrel 474 are disposed in the same phase. Thereby, the cam groove 416a, the cam groove 416b, and the cam groove 416c are also disposed in the same phase. In addition, in order to suppress tilting of the lens held by the cam groove 416a, the cam groove 416b, and the cam groove 416c, it is necessary to make the cam intersection angle as small as possible. In order to reduce the cam intersection angle, it is necessary to make the developed length of the cam large (increase the cam rotation angle). In a case where the cam rotation angle is made large, it becomes difficult to dispose each cam in the straight-proceeding groove in a shifted phase. In a case where each cam in the straight-proceeding groove is disposed in a shifted phase, the efficiency of cam arrangement deteriorates. As a result, the length of the cam increases, which leads to a problem of an increase in the entire lens.

In the present example, a diameter fitting part 435c formed on the zoom ring 435 and a diameter fitting part 474c formed on the guide barrel 474 are radially fitted to each other, so that the zoom ring 435 is rotatably held by the guide barrel 474. Here, both the diameter fitting part 435c and the diameter fitting part 474c are formed to be fitted throughout its circumference with no notch. By forming the diameter fitting part 435c and the diameter fitting part 474c to be fitted throughout its circumference with no notch, the eccentric position of the zoom ring 435 with respect to the guide barrel 474 can be determined with a good degree of accuracy, and thus it is possible to determine the tilt of the straight-proceeding barrel 417 with a good degree of accuracy. Thereby, in the present example, the tilt position of the first group lens 451 is determined with a good degree of accuracy, and thus it is possible to maintain high optical performance.

In order to realize that the diameter fitting part 474c of the guide barrel 474 is formed to be fitted throughout its circumference, the straight-proceeding groove 474b of the guide barrel 474 is formed as a groove having a bottom on the outer diameter side (a bottomed groove) and as a straight-proceeding groove along the optical axis direction by processing (inner processing) from the inner diameter side of the guide barrel 474. On the other hand, since the guide barrel 474 is located on the inner diameter side of the straight-proceeding barrel 417, and the cam ring 416 is located further on the inner diameter side, the straight-proceeding groove 474a is formed as a through groove. Therefore, the straight-proceeding groove 474a forms a through hole (a through groove) penetrating to the inner diameter side through processing (outer processing) from the outer diameter side of the guide barrel 474, and is formed as a straight-proceeding groove along the optical axis direction. In addition, the straight-proceeding groove 474a is formed so as not to overlap the diameter fitting part 474c of the guide barrel 474 in the optical axis direction. In this manner, processing of the straight-proceeding groove 474b and processing of the straight-proceeding groove 474a are separated from each other by different processing means (processing units), and thus it is possible to form the entire circumference of the diameter fitting part 474c.

Here, the straight-proceeding groove 474b and the straight-proceeding groove 474a of the guide barrel 474 will be described below in detail with reference to FIGS. 4A to 4C and FIGS. 5A to 5C.

Figure 4A:
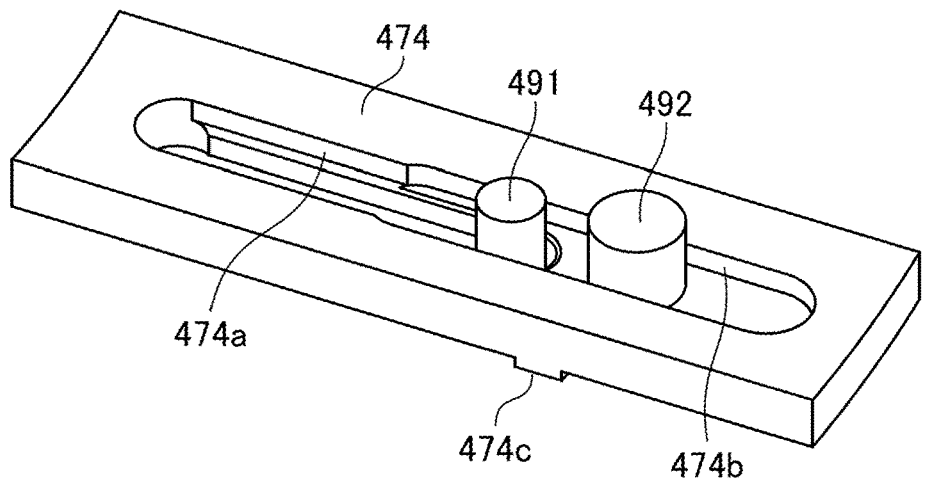
FIGS. 4A to 4C are diagrams schematically illustrating a configuration of a guide groove of a guide barrel of Example 1.
Figure 4B:
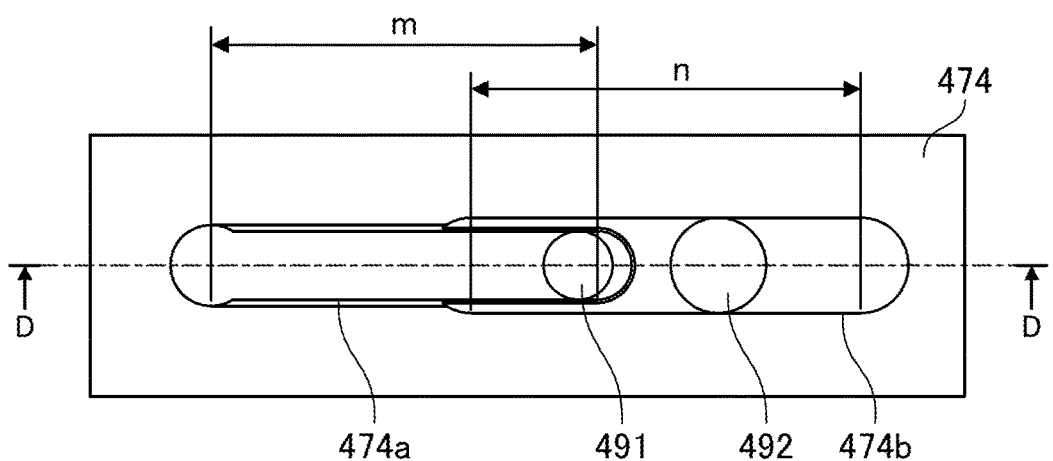
Figure 4C:
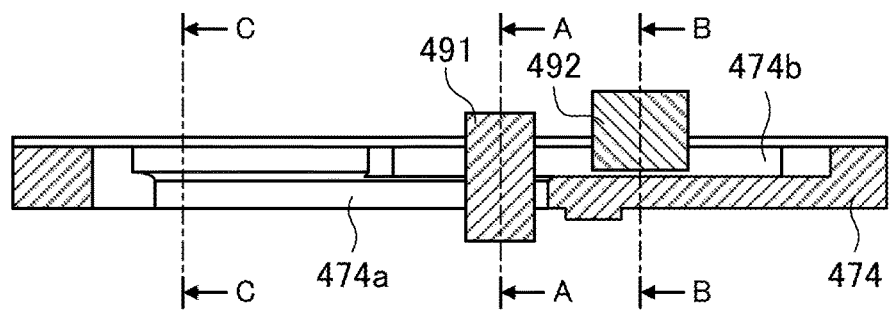
Figure 5A:
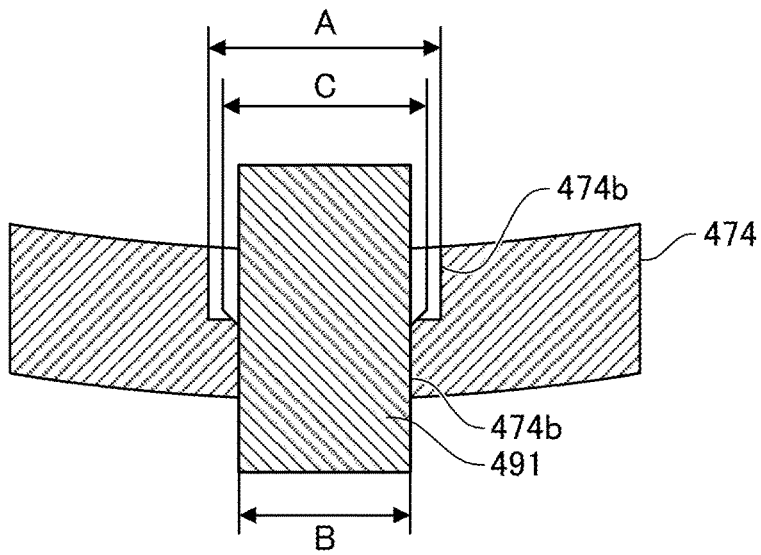
FIGS. 5A to 5C are cross-sectional views of the guide groove of the guide barrel of Example 1 in a direction orthogonal to an optical axis.
Figure 5B:
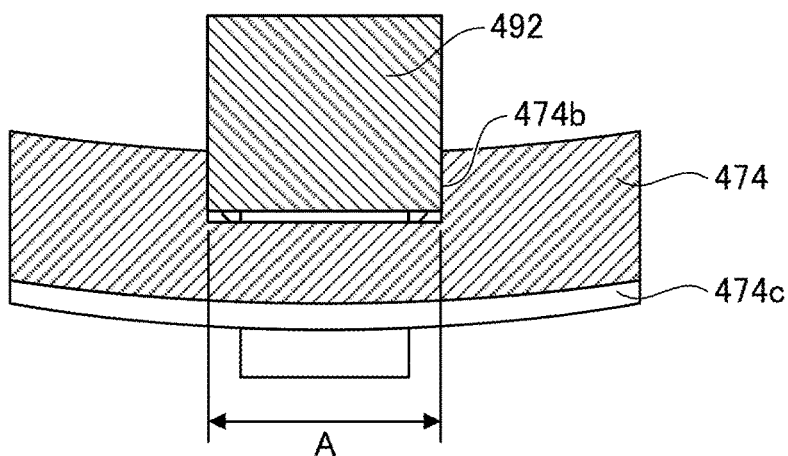
Figure 5C:
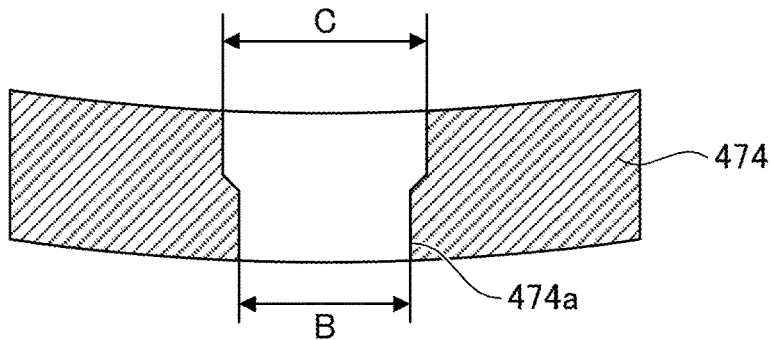

FIGS. 4A to 4C are diagrams schematically illustrating configurations of the straight-proceeding groove 474a and the straight-proceeding groove 474b as the guide grooves of the guide barrel 474 of the present example. FIGS. 5A to 5C are cross-sectional views when the guide groove of the guide barrel 474 of the present example is viewed in the optical axis direction. FIG. 4A is a perspective view of the guide barrel 474. FIG. 4B is a diagram of the straight-proceeding groove 474a and the straight-proceeding groove 474b of the guide barrel 474 from the inner diameter side. FIG. 4C is a cross-sectional view along D-D in FIG. 4B. In the cross-sectional view shown in FIG. 4C, the upper side of the drawing is the inner diameter side, and the lower side of the drawing is the outer diameter side.

Here, as shown in FIGS. 4A to 4C, the straight-proceeding groove 474b is located on the inner diameter side, the straight-proceeding groove 474a is located on the outer diameter side, and the straight-proceeding groove 474b and the straight-proceeding groove 474a are connected to each other. As shown in FIG. 4B, m is a range of the straight-proceeding groove 474a in the optical axis direction, and n is a range of the straight-proceeding groove 474b in the optical axis direction. In the drawing, n and m have regions that partially overlap each other in the optical axis direction. Even in the region where n and m overlap each other, the straight-proceeding groove 474a and the straight-proceeding groove 474b are disposed so as not to overlap each other in a direction orthogonal to the optical axis (radial direction). In this manner, in the entire use region of the straight-proceeding groove 474b and the straight-proceeding groove 474a, the widths of the grooves in a direction orthogonal to the optical axis are constant, and it is taken into consideration that the characteristics do not change in the entire use region.

FIG. 5A is a cross-sectional view along A-A in FIG. 4C. FIG. 5B is a cross-sectional view along B-B in FIG. 4C. FIG. 5C is a cross-sectional view along C-C in FIG. 4C. Meanwhile, each cross section shown in FIGS. 5A to 5C corresponds to the position of each member in the cross-sectional view of FIG. 2.

Here, as shown in FIGS. 5A to 5C, the groove width of the straight-proceeding groove 474a is defined as a through straight-proceeding groove width B, and the groove width of the straight-proceeding groove 474b which is a bottomed groove is defined as a bottomed straight-proceeding groove width A. The above-described range m of the straight-proceeding groove 474a in the optical axis direction is a range that does not overlap the range n in the optical axis direction, and as shown in FIG. 5C, the width of a groove (clearance groove, a third guide groove part) located further inside than the use region (use range) of the straight-proceeding groove 474a is defined as a clearance groove width C. In FIG. 5A, the cam follower 491 on the straight-proceeding barrel 417 side has to escape the straight-proceeding groove 474b from the outer circumferential side and penetrate to the cam ring 416 on the inner circumferential side. In a case where the through straight-proceeding groove width B is small, it is only required that rollers (cam followers) to be engaged have the same diameter, which leads to a tendency to escape. This makes it possible to secure the hooking amount of the straight-proceeding barrel 417 long.

In this case, the relation between the bottomed straight-proceeding groove width A, the through straight-proceeding groove width B, and the clearance groove width C is represented by the following Expression (1).

Through straight-proceeding groove width B<clearance groove width C<bottomed straight-proceeding groove width A    (1)

In a case where the relation of Expression (1) is satisfied, the processability is excellent, and it is possible to realize processing in which the straight-proceeding groove 474a and the straight-proceeding groove 474b have a constant shape in the use region.

Figure 6:
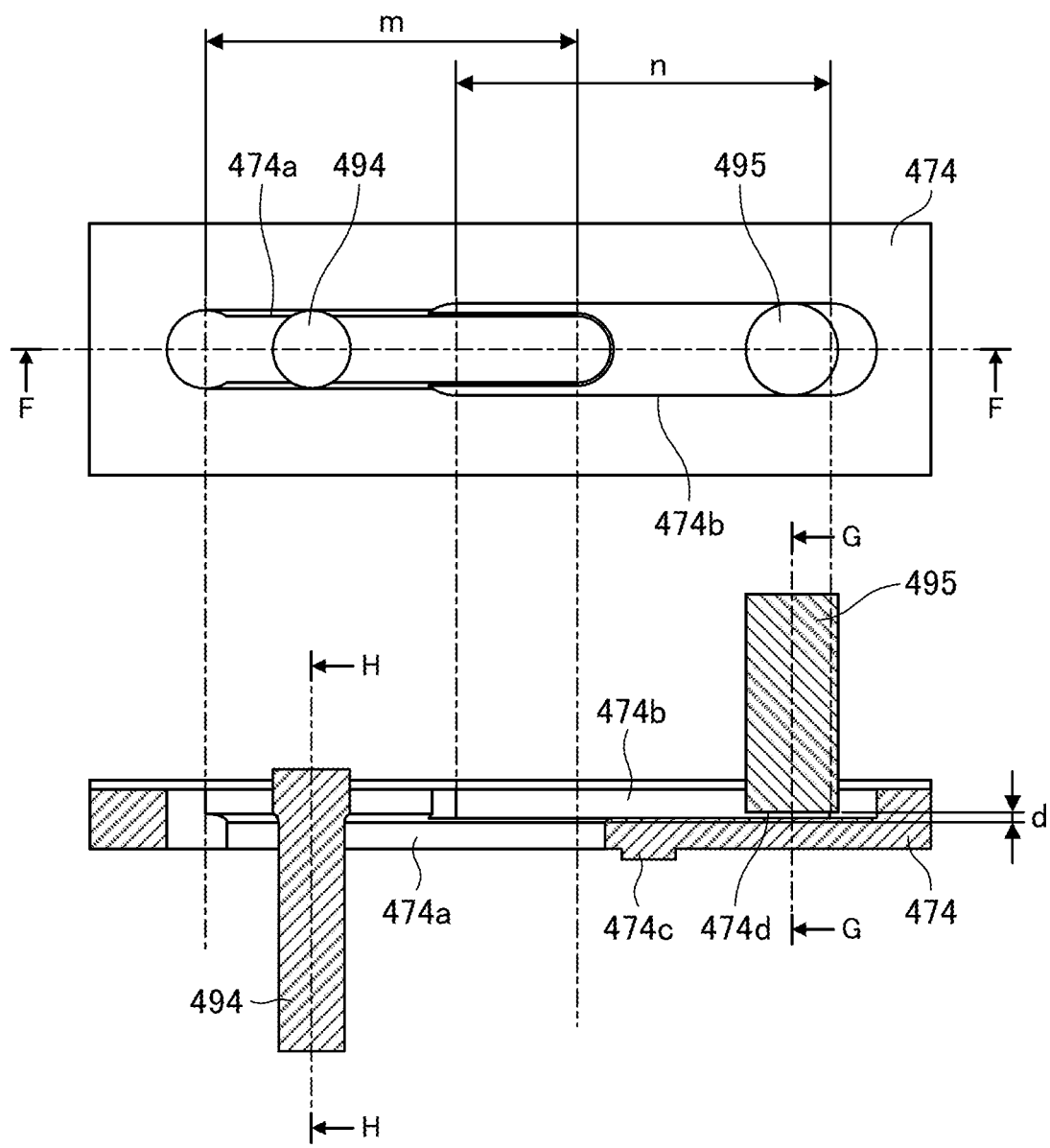
FIG. 6 is a diagram schematically illustrating processing of the guide groove of the guide barrel of Example 1.
Figure 7A:
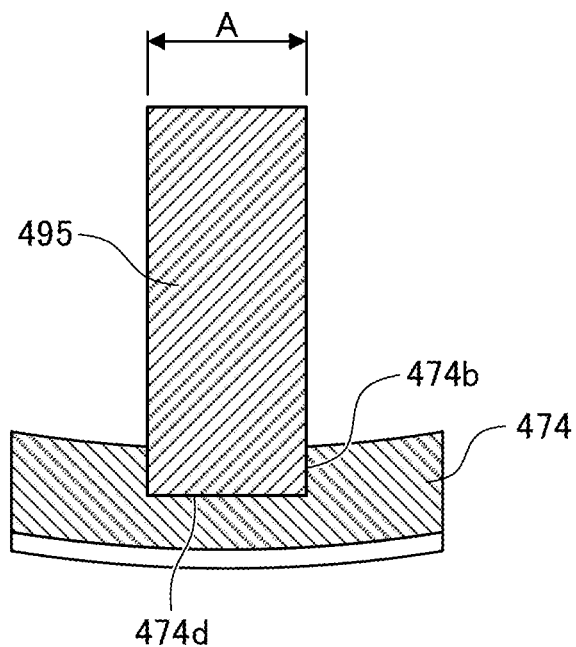
FIGS. 7A and 7B are cross-sectional views of the processing of the guide groove of the guide barrel of Example 1 in the direction orthogonal to the optical axis.
Figure 7B:
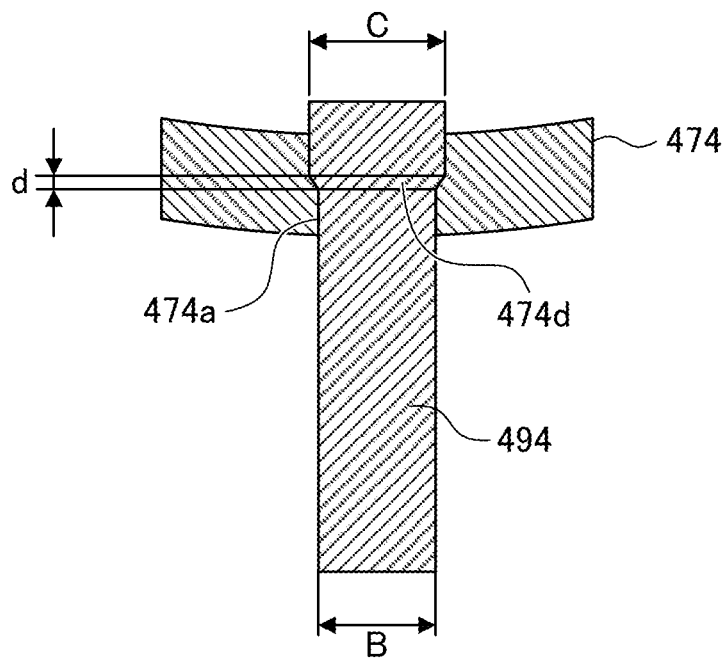

Hereinafter, a processing method that satisfies the relational expression of Expression (1) will be described with reference to FIG. 6 and FIGS. 7A and 7B. FIG. 6 is a diagram schematically illustrating processing of the straight-proceeding groove 474a and the straight-proceeding groove 474b as the guide grooves of the guide barrel 474 of the present example. FIGS. 7A and 7B are cross-sectional views of FIG. 6 schematically illustrating processing of the straight-proceeding groove 474a and the straight-proceeding groove 474b. FIG. 7A is a cross-sectional view illustrating a cross section along G-G in FIG. 6. FIG. 7B is a cross-sectional view illustrating a cross section along H-H in FIG. 6.

The processing of the straight-proceeding groove 474a and the straight-proceeding groove 474b is performed using a cutting tool for forming a groove. In the present example, for example, an end mill is used as a cutting tool. An end mill 494 cuts and processes a groove located further inside than the use ranges of the straight-proceeding groove 474a and the straight-proceeding groove 474b. The end mill 494 forms the through straight-proceeding groove width B and the clearance groove width C when processing a clearance groove located further inside than the use ranges of the straight-proceeding groove 474a and the straight-proceeding groove 474b.

An end mill 495 cuts and processes the straight-proceeding groove 474b. The end mill 495 forms the bottomed straight-proceeding groove width A when processing the straight-proceeding groove 474b. In addition, at the time of processing, the end mill 495 connects the through straight-proceeding groove width B and the clearance groove width C with an inclined surface part. The width of this inclined surface part in a direction orthogonal to the optical axis is defined as d. A bottom 474d is a bottom of the straight-proceeding groove 474b. In addition, the position of the bottom 474d in the direction orthogonal to the optical axis is set to be within the width d of the inclined surface part in the direction orthogonal to the optical axis. By setting as described above, a groove having the above shape can be realized only by processing the range m in the optical axis direction from the outer side of the guide barrel 474 with the end mill 494 and processing the range n in the optical axis direction from the inner side of the guide barrel 474 with the end mill 495. Meanwhile, although an end mill is used as the cutting tool for processing the straight-proceeding groove 474a and the straight-proceeding groove 474b in the present example, the present invention is not limited thereto, and processing may be performed by cutting tools other than the end mill which can perform the same processing.

A method of performing inner processing on both the range m in the optical axis direction and the range n in the optical axis direction with the end mill 495 can also be considered, but in that case, the processing time increases and the processing cost increases.

In addition, in the inner processing, due to the characteristics of a processing machine that performs the above processing, it is difficult to take a large processing length, and thus the processing length may be limited. Even in such a case, since the inner processing range can be set to be short by the processing method in the present example, it is not likely to be subject to processing restrictions and any processing can be performed.

As stated above, the straight-proceeding groove 474a and the straight-proceeding groove 474b described above are processed by different processing means, so that both the diameter fitting part 435c and the diameter fitting part 474c can be formed to be fitted throughout its circumference with no notch. Thereby, since the tilt of the straight-proceeding barrel 417 can be determined with a good degree of accuracy, the tilt position of the first group lens 451 is determined with a good degree of accuracy, and thus it is possible to provide an optical apparatus having excellent optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-083261, filed May 11, 2020, which is hereby incorporated by reference wherein in its entirety.

What is claimed is:

1. An optical apparatus comprising:
a straight-proceeding barrel configured to move a lens group in an optical axis direction; and
a guide barrel including a guide groove part configured to guide the movement of the straight-proceeding barrel in the optical axis direction, wherein the guide groove part includes:

a first guide groove part extending in the optical axis direction with a bottom thereof on an outer diameter side of the guide barrel; and a second guide groove part extending in the optical axis direction as a through hole from the outer diameter side to an inner diameter side of the guide barrel, and wherein the first guide groove part and the second guide groove part are connected to each other and include respective use regions configured to partially overlap each other in the optical axis direction.

2. The optical apparatus according to claim 1, wherein the guide groove part includes a third guide groove part as a clearance groove further inside than the use region of the second guide groove part.

3. The optical apparatus according to claim 2, wherein the following relation is satisfied:

B<C<A, where A is a width of the first guide groove part in a direction orthogonal to the optical axis B is a width of the second guide groove part in the direction orthogonal to the optical axis and C is a width of the third guide groove part in the direction orthogonal to the optical axis.

4. The optical apparatus according to claim 1, wherein, as viewed along the optical axis, the first guide groove part and the second guide groove part are formed in the same direction with respect to the optical axis.

5. The optical apparatus according to claim 1, wherein:
the guide barrel includes a diameter fitting part on an outer circumferential part of the guide barrel, and
the diameter fitting part is disposed on the outer diameter side of the first guide groove part and does not overlap the second guide groove part.

6. The optical apparatus according to claim 5, further comprising:

a zoom ring rotatably held by the guide barrel that includes a diameter fitting part interposed therebetween, wherein the zoom ring includes a first cam groove engageable with a first cam follower on an inner diameter side.

7. The optical apparatus according to claim 6, wherein, in addition to the first cam groove part, the first cam follower is engageable with:

the first guide groove part of the guide barrel disposed on the inner diameter side of the straight-proceeding barrel; and a second cam groove part included in a cam ring that includes a plurality of cam grooves disposed on the inner diameter side of the guide barrel.

8. The optical apparatus according to claim 6, wherein:
the zoom ring is rotatably held by the guide barrel by the diameter fitting part of the guide barrel and the diameter fitting part of the zoom ring being fitted to each other, and
the diameter fitting part of the guide barrel and the diameter fitting part of the zoom ring-include no notch.

9. The optical apparatus according to claim 2, further comprising:
an inclined surface part between the second guide groove part and the third guide groove part, and
wherein, where d is a width of the inclined surface part in a direction orthogonal to the optical axis, a position on a bottom of the second guide groove part in the direction orthogonal to the optical axis is within the width d in the direction orthogonal to the optical axis.

10. The optical apparatus according to claim 1, wherein the first guide groove part and the second guide groove part are each formed by different processes.

* * * * *